July 2, 1968  HIDEKI MAKABE  3,390,604
APPARATUS FOR INTERCHANGING DIFFRACTION
GRATINGS IN A GRATING SPECTROSCOPE
Filed Dec. 21, 1964  4 Sheets-Sheet 1
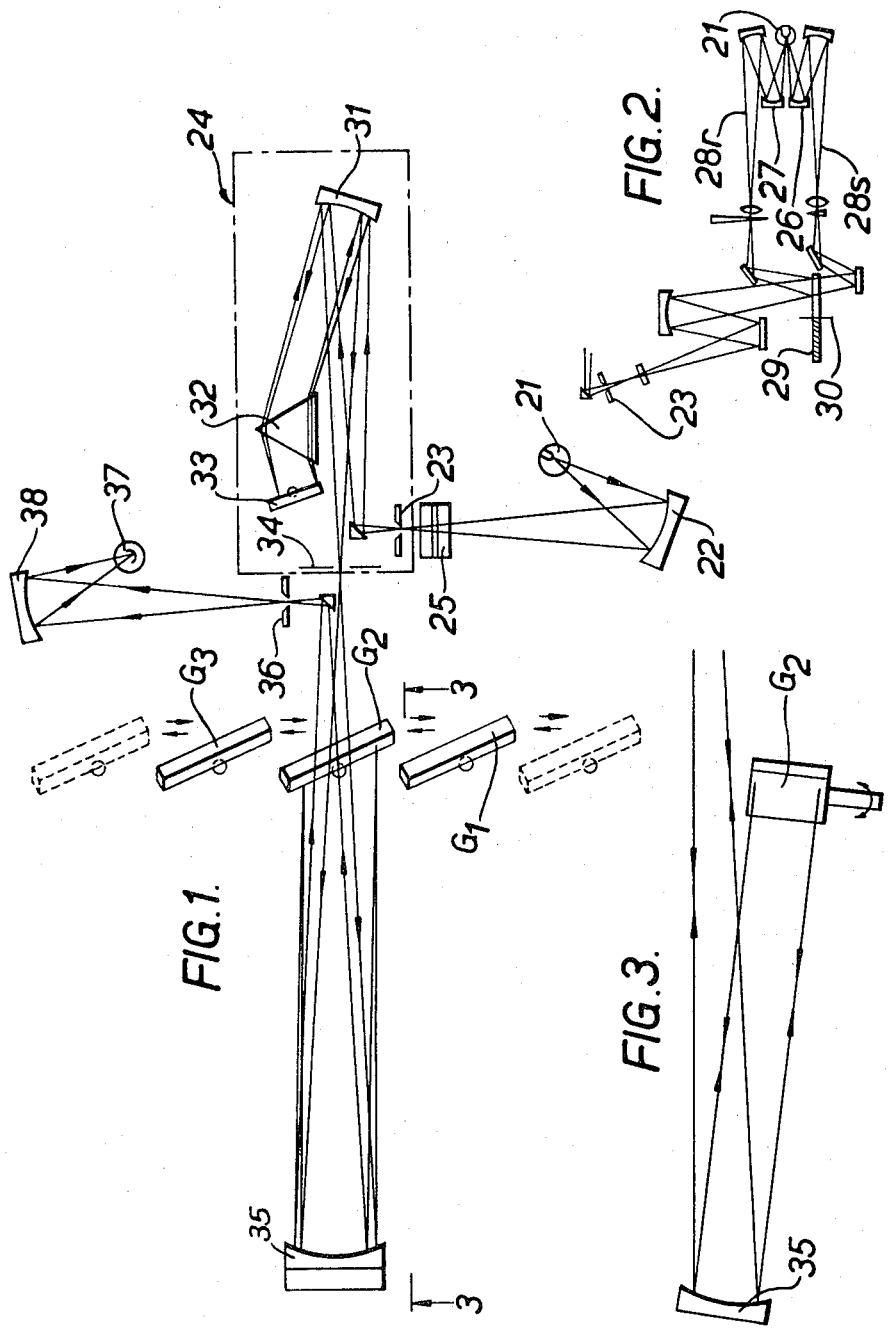

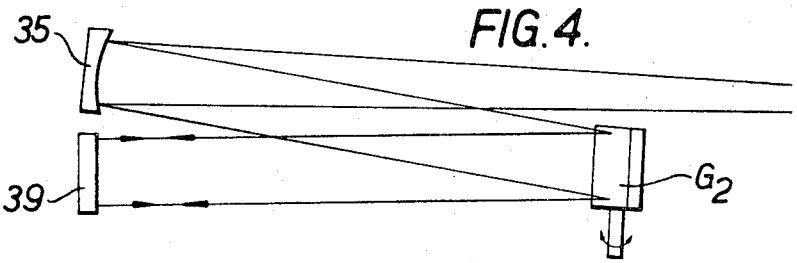
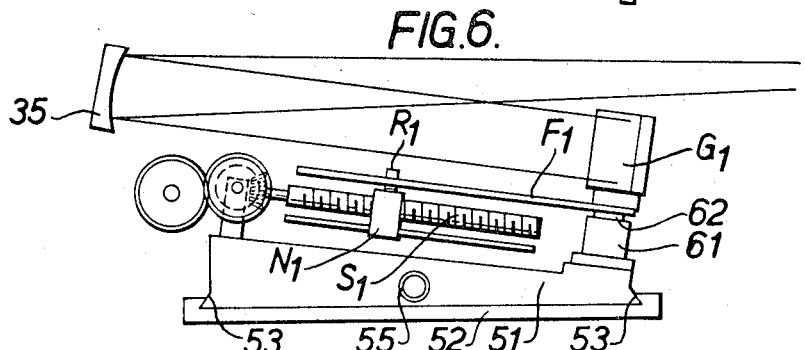
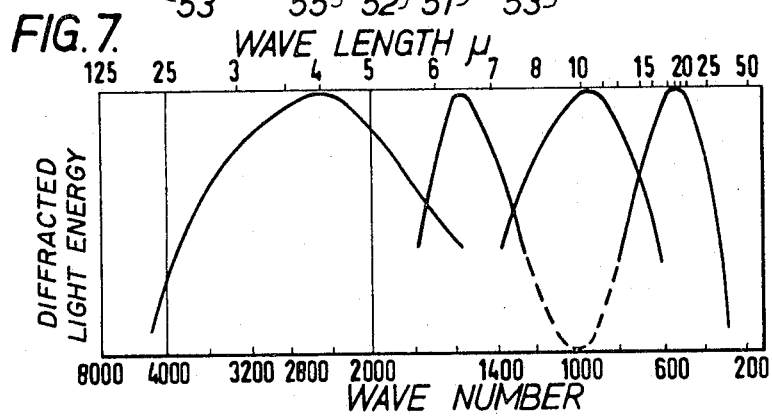
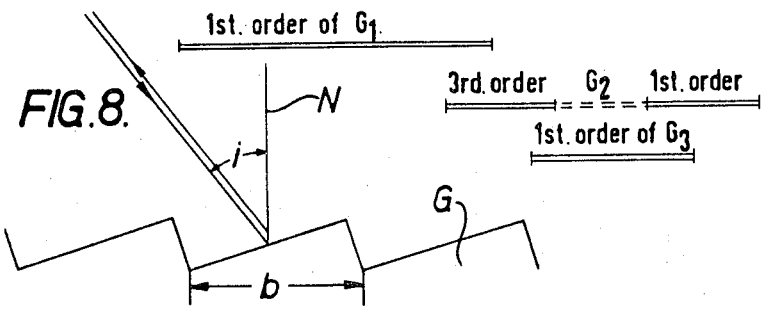

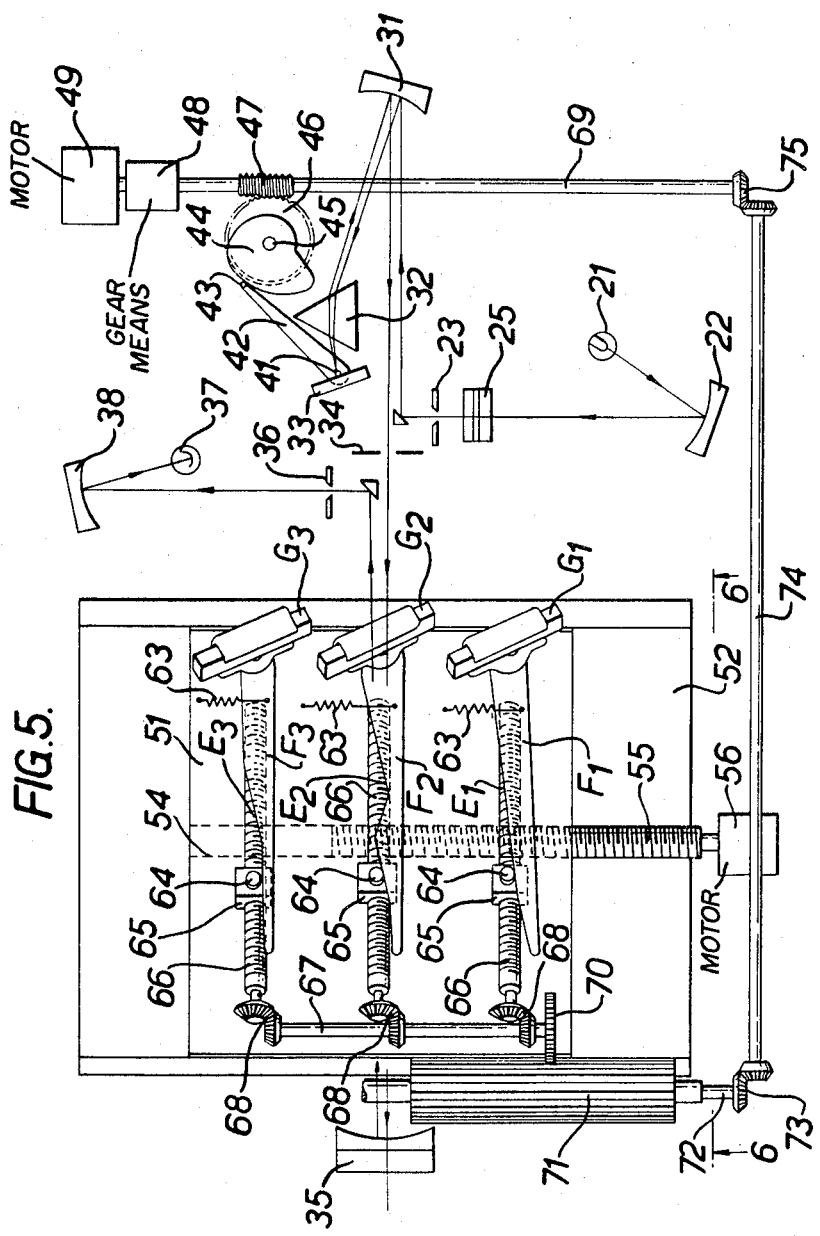

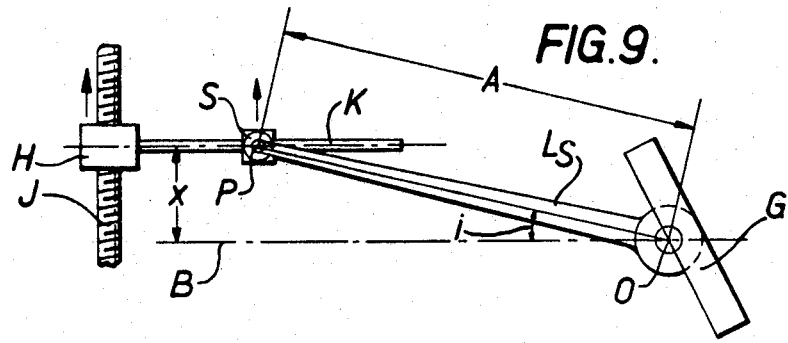
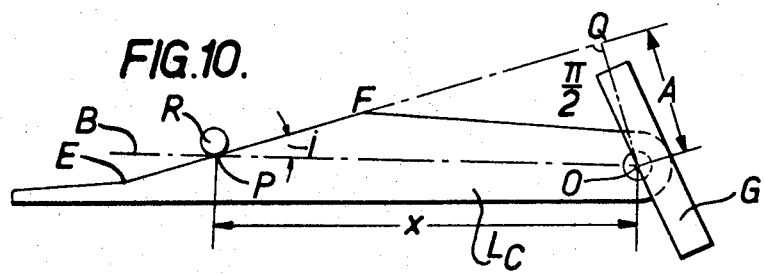
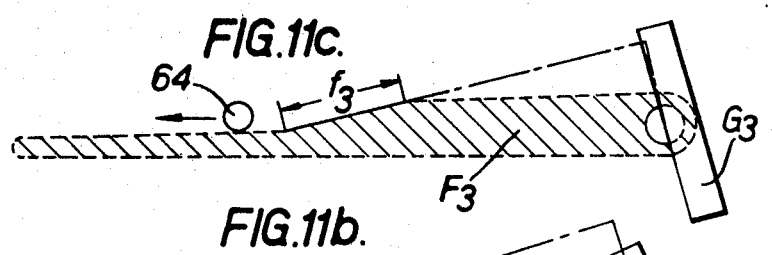
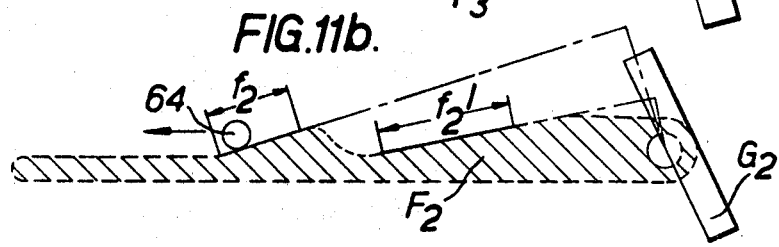
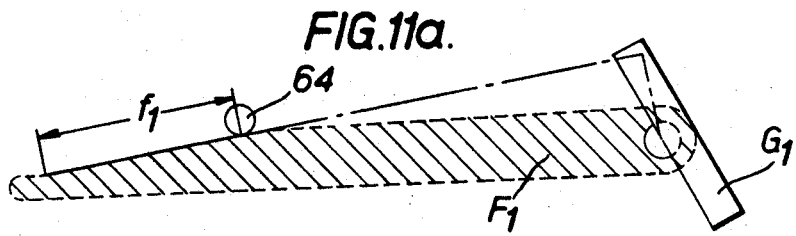

United States Patent Office 3,390,604
Patented July 2, 1968

3,390,604
APPARATUS FOR INTERCHANGING DIFFRACTION GRATINGS IN A GRATING SPECTROSCOPE
Hideki Makabe, Kyoto, Japan, assignor to Shimadzu Seisakusho Ltd., Kyoto, Japan
Filed Dec. 21, 1964, Ser. No. 419,910
Claims priority, application Japan, Dec. 25, 1963, 38/69,972
8 Claims. (Cl. 88—14)

ABSTRACT OF THE DISCLOSURE

Apparatus for interchanging two or more gratings having different grating spaces in a grating spectroscope in which the gratings are arranged on a table in spaced relationship in a straight line direction substantially perpendicular to the optical path of parallel rays from a collimator and the table is moved in the direction of arrangement of the gratings so that the gratings may be selectively placed in the optical path of the parallel rays from the collimator, the angle of incidence upon each of the gratings being continuously variable by revolving each of the gratings about its own pivotal axis. Improvements are provided in the drive mechanism for two or more gratings utilizing sine function or cosecant function generators so that the scanning of the wavelength or wavenumber with the gratings is carried out in a linearly proportional relationship with the drive movement for revolving the gratings about their own pivotal axes.

This invention relates to grating spectroscopes, and more particularly, to reflection grating spectroscopes.

The use of diffraction gratings instead of refraction prisms for the study of spectra gratings has the advantages of constant and usually greater dispersion and resolution, as well as opportunity to observe extreme ultra-violet and infra-red spectra for which no transparent prisms can be found. Modern gratings are made by ruling with a diamond point equidistant parallel lines on a polished plate of brass, of speculum (copper+tin) metal, or of glass on which a film of aluminum has been deposited. A grating ruled on a sheet of transparent glass is called "transmission grating," but it is impossible to rule large areas of glass without wearing down the diamond point. For this and other good reasons most gratings are ruled on opaque soft metal surfaces, and are called "reflection gratings." The fundamental principle is the same in both cases.

The simple theory of the reflection grating gives the wavelength of light as a function of the grating space and of angles of incidence and diffraction of the light rays. Suppose that a beam of parallel rays falls on an echellete reflection grating with a grating space $b$. The difference in path travelled by corresponding rays from adjacent grooves, or the retardation as it is called, is given by the general equation:

$$n\lambda = b\ (\sin i \pm \sin \theta n)$$

wherein $n$ is the order number, $\lambda$ is the wavelength, $i$ is the angle of incidence with the normal and $\theta n$ is the angle of diffraction in the $n$-order with the normal, the positive or negative sign being used when incident and diffracted rays are on the same or opposite sides of the normal, respectively. Whenever this equals one or more whole wavelengths $n\lambda$, a bright image is seen in color corresponding to $\lambda$.

If the grating space is not too small the groove form of the ruled lines can be controlled by shaping the diamond point in such a way that the diffracted light is largely concentrated in one general direction or spectral region. Such gratings may, for example, give an intense visible spectrum and weak ultra-violet, or vice versa. The wavelength of the most intense energy is called the "blaze" wavelength. The blaze wavelength is obtained when the angle of incidence becomes normal to the inclination of the ruled line grooves. The condition for the blaze wavelength depends on the grating space and the inclination of the ruled line grooves. For example, in a diffraction grating with 75 lines per 1 mm., namely with a grating space $1/75$ mm., the energy of the diffraction rays is maximum when the inclination of the ruled line grooves with the normal is 26° 45', the blaze wavelengths being $12\mu$ in the first-order spectrum, $6\mu$ in the second-order etc. Various diffraction orders in a single grating give different ranges of wavelengths. The wavelength observed may be changed by revolving the grating about an axis. The movement of the grating for scanning is usually given either by a peripheral cam which may be called a "wavelength cam" or "wavenumber cam" or by a cosecant function generator which comprises a cosecant bar having a certain linear slope and a linearly driven member cooperating with the cosecant bar. The scanning in any one order spectra is carried out with use of a filter or monochromator of a low dispersion degree before the inlet slit or after the outlet slit so that any other order spectra may be eliminated. At the end of the scanning operation in the first-order spectra the grating must be turned back to the former position for the scanning in the next order spectra. For this purpose, the wavelength cam or cosecant bar should be shaped in a serrated form at this position. A series of scanning over two or more order spectral regions is inevitably discontinuous. In case that the spectrum diagram is fed in interconnection with the wavelength or wavenumber cam or the linearly driven member, the spectrum diagram will become discontinuous at the cliff positions of the cam. The wavelength or wavenumber or the cosecant bar of a serrated form is disadvantageous in that it is irreversible in the movement. In addition, the higher the order, the more frequent changes in the order are necessary.

In view of the above-mentioned drawbacks common to conventional spectroscopes with a single grating, an attempt has been made to devise a spectroscope in which two or more diffraction gratings rotatable about their own axes are arranged on a turntable so that the gratings may be alternately put in the optical path of parallel rays from a collimator during the rotation of the turntable. In this multiple-grating spectroscope, it is necessary to stop the turntable with high accuracy in predetermined positions where the gratings are selectively put in the optical path of parallel rays from a collimator. An inaccurate positioning of the turntable would cause errors in the angles of incidence and diffraction on the grating. It is a task of extreme difficulty to stop and set up the turntable with high accuracy in predetermined positions.

It is a principal object of the invention to provide a grating spectroscope in which the scanning operation can be continuously carried out through a wide wavelength or wavenumber region over two or more order spectral regions.

Another object of the invention is to provide a grating spectroscope in which the scanning operation may be carried out reversibly at any wavelength or wave-number region.

A further object is to provide a grating spectroscope in which the interchange of gratings can be carried out without liability of causing any errors in the angles of incidence and diffraction on the gratings.

A still further object is to provide a grating spectroscope in which the measurements can be made over a wide wavelength or wavenumber region with a relatively small number of the interchange of gratings and/or spectral orders.

According to the invention, at least two diffraction gratings are arranged on a linearly movable table in a spaced relationship in a direction transverse to the optical path of parallel rays from a collimator. The table is linearly movable in the direction of arrangement of the gratings so that the gratings may be selectively put in the optical path. In this manner, the relative angle of each grating with respect to the parallel rays from the collimator is always maintained in a constant value. There is no liability of causing errors in the angles of incidence and diffractions on the grating due to its inaccurate positioning. The only conditions for positioning the grating is that the grating be placed in the optical path so as to receive the full width of parallel rays from the collimator lens or mirror.

The diffraction gratings may be of the echellete reflection type and have different grating spaces for different wavelength or wavenumber regions. The two different gratings may have different first-order spectral regions. The first-order spectral region is the strongest in the spectral intensity and the widest. The use of a plurality of gratings permits the reduction of the number of interchanges of spectral regions in comparison with the case of a single grating.

Each of the gratings is rotatable about its own axis for scanning a certain narrow range of wavelength or wavenumber. In a preferred embodiment of the invention, each of the gratings is revolved about its own axis by a cosecant function generator. The cosecant function generator consists of a cosecant bar or arm having the linear slope of a certain angle and a linearly driven member cooperating with the cosecant bar. One end of the cosecant bar is secured to the grating while the other end is free and engages with the linearly driven member. The linearly driven member may be attached to a nut riding on a lead screw. Each of the cosecant bars has at least one operative length, namely, a linearly sloped portion which is operative to engage with the linearly driven member when the grating attached thereto is placed in the optical path. The remaining length portions may be shaped in any form but so as not to form a serration. The driving mechanisms for the cosecant function generators may be interconnected to each other so that all the gratings can be manipulated at the same time. The respective linearly driven members come successively to the operative length portions of the corresponding cosecant bars. A complete wavelength or wavenumber scanning is obtained during a forward or return stroke of simultaneous movement of all the linearly driven members.

One or more of the gratings may be used over two spectral order ranges which have different wavelength or wavenumber regions spaced to each other. The wavelength or wavenumber region therebetween may be covered by another grating. In this case the cosecant bar for the grating covering two different wavelength or wavenumber regions must have two operative length portions. The connecting portion between these two operative portions may be shaped with a gradual curve continuous as to both of them. In this manner, the cosecant bar is operable by the cooperating linearly driven member both in its forward and return movement.

It is also possible to revolve the gratings through the utilization of a sine function generator.

Other objects and advantages of the invention will become apparent from the detailed description which follows when taken in conjunction with the accompanying drawings in which:

FIG. 1 is a schematic view showing the optical system of the apparatus of the invention;

FIG. 2 shows another embodiment of the illuminating system;

FIG. 3 is an elevation taken along the line of 3—3 in FIG. 1;

FIG. 4 is a similar view to FIG. 3, in which a double reflection system of the diffracted light is illustrated;

FIG. 5 is a plan view showing mechanical construction of the apparatus of the invention;

FIG. 6 is an elevation taken along the lines 6—6 of FIG. 5;

FIG. 7 is a diagram showing the energy distributions of diffracted lights from three gratings;

FIG. 8 is an enlarged diagram showing the path of a ray reflected on the echellete grating.

FIG. 9 diagrammatically illustrates the sine function generator;

FIG. 10 diagrammatically illustrates the cosecant function generator;

FIGS. 11a, 11b and 11c show three cosecant bars having different operative portions corresponding to the three gratings, respectively.

Referring now more particularly to the drawings, the basic system of the grating spectroscope of the invention is illustrated in FIG. 1. The light from a light source 21 focuses by a spherical mirror 22 into an image at the inlet slit 23 of a monochromator generally indicated as 24. Before entering into the monochromator 24, the light passes through a sample cell 25 containing a sample to be analyzed. The illuminating system shown in FIG. 1 may be replaced by such a double path system as shown in FIG. 2. In FIG. 2, the light from a light source 21 is divided by a pair of mirrors 26 and 27 into two beams 28s and 28r. These two beams illuminate the system alternately. The sample to be analyzed is put in one beam 28s while the other beam 28r with no sample is merely used for the reference. The two beams 28s and 28r may be called a "sample beam" and a "reference beam," respectively. In case of the embodiment as shown in FIG. 2, the spectroscopic system of the invention is illuminated at a time by either of two beams 28s and 28r. 29 denotes a mirror for illuminating the system with one of the two beams, selectively. The mirror 29 may be shaped in a semi-circular form and rotate about an axis 30 at a high speed so that the system may be illuminated with the sample beam during the first half rotation of the mirror 29 and with the reference beam during the second half rotation. Though, preferably, the system of the invention is illuminated in such a double beam manner as shown in FIG. 2, the system may be illuminated with a single beam as shown in FIG. 1.

The light from the illuminating system enters into the monochromator 24 which may be of low dispersion degree to roughly disperse the white light from the light source 21. It may comprise an inlet slit 23, a collimating mirror 31, a prism 32, a Littrow mirror 33 and an outlet slit 34. The monochromator 24 may be replaced by a suitable filter which will allow only a narrow range of wavelength or wavenumber to pass therethrough.

A selected narrow range of wavelength or wavenumber leaving from the outlet slit 34 of the monochromator 24 enters into the spectral apparatus of the invention which includes at least two gratings which are arranged so as to be selectively positioned in the optical path. In the embodiment illustrated by way of example in FIG. 1, three gratings $G_1$, $G_2$ and $G_3$ are arranged in a spaced relationship in the direction transverse to the optical path so that they may be selectively put in the line of reflection from a collimating mirror 35 which makes parallel the rays leaving from the outlet slit 34 of the monochromator 24.

Each of the gratings $G_1$, $G_2$ and $G_3$ may be of an echellete reflection type. These three gratings have different grating spaces and different blaze wavelengths for different wavelength ranges as described in detail hereinafter. The diffracted light from any of the gratings $G_1$, $G_2$ and $G_3$ is reflected by the mirror 35 toward an outlet slit 36. Only a single wavelength passes through the outlet slit 36 and in turn reaches a detector 37 to focus through a mirror 38 into a spectrum on it. The detector 37 may be of any of the visual, photoelectric, radiometric and photographic types. The reflection system of the diffracted light may be of either the single path system or the double path system, as shown in FIGS. 3 and 4, respectively. In FIG. 4, 39 is a plane mirror or reflection grating reflecting the diffracted light from any of the main gratings $G_1$, $G_2$ and $G_3$ to said selected main grating.

FIGS. 5 and 6 illustrate mechanical construction of the apparatus according to the invention. The same reference numerals both in FIGS. 1 to 4 and FIGS. 5 and 6 indicate the same or corresponding members.

Refering to FIG. 5, the Littrow mirror 33 is movable about a pivotal axis. The Littrow mirror 33 is fixed on a pivot 41 which is pivotally carried by suitable means. The pivot 41 is also secured to one end of a cam follower 42 which is provided at the other end with a roller 43. The roller 43 engages with a wavelength or wavenumber cam 44 which is in turn fixed on a shaft 45 and driven by a worm 47 which is in turn connected through gearing 48 to a power drive such as a motor 49. When the cam 44 is turned, the Littrow mirror 33 with the cam follower 42 is moved about the pivot 41, whereby the angle of incidence to the Littrow mirror may be varied. The wavelength which passes through the outlet slit 34 of the monochromator 24 varies according to the angle of incidence on the Littrow mirror 33. In this manner, the scanning operation of the range of wavelength entering into the spectral apparatus with gratings may be continuously carried out.

Three gratings $G_1$, $G_2$ and $G_3$ are mounted on a slide table 51. The three gratings $G_1$, $G_2$ and $G_3$ are arranged on the slide table 51 in a spaced relationship in the direction transverse to the optical path of the parallel light from the collimating mirror 35. The slide table 51 is movable on a fixed bed 52 along guides 53 extending parallel to the direction of arrangement of the gratings $G_1$, $G_2$ and $G_3$ so that one of said gratings $G_1$, $G_2$ and $G_3$ may be selectively put in the optical path at a time. The slide table 51 engages at its longitudinally extending female screw 54 with a drive lead screw 55 which is carried rotatably but not permitting the movement in the direction of the axis. The drive lead screw 55 is driven by a suitable drive power such as motor 56.

As mentioned before, three gratings $G_1$, $G_2$ and $G_3$ have different grating spaces and different blaze wavelengths or wavenumbers for different wavelength or wavenumber ranges. For example, in case of the spectral analysis of infrared rays, the first grating $G_1$ may have 150 ruled lines per mm. with a blaze wavelength of $4\mu$ in the first-order while the second and third gratings $G_2$ and $G_3$ may have 45 and 75 ruled lines per mm. with blaze wavelengths of $20\mu$ and $12\mu$ in the first-order, respectively. The energy distributions of the diffracted lights from these three gratings are shown in FIG. 7. It will be understood from FIG. 7 that the second grating has also a blaze wavelength of about $6.6\mu$ in the third-order.

The first grating $G_1$ can be used in the first-order for the wavenumber range from 4,000 cm.$^{-1}$ to 1.550 cm.$^{-1}$, the second grating $G_2$ in the third-order for the wavenumber range from 1,750 cm.$^{-1}$ to 1,280 cm.$^{-1}$, the third grating $G_3$ in the first-order for the wavenumber range from 1,360 cm.$^{-1}$ to 650 cm.$^{-1}$ and the second grating $G_2$ in the first-order for the wavenumber range from 780 cm.$^{-1}$ to 400 cm.$^{-1}$. The combination of these four contiguous wavenumber ranges covers a wide wavenumber region from 4,000 cm.$^{-1}$ to 400 cm.$^{-1}$ with the respective spectral intensities strong enough to be detected.

The wavelength which passes through the outlet slit 36 of the spectral apparatus of the invention varies according to the angle of incidence on the grating put in the optical path. The angle of incidence can be varied by moving the grating about its own axis. The movement of the grating about its own axis may be controlled by a link or cam mechanism. For such a mechanism for controlling the movement of the grating there are known the so-called "sine function generator" and "cosecant function generator." Preferably, the invention utilizes either the sine or cosecant function generator, but any other types of wavelength or wavenumber cams may be used in revolving the gratings.

FIG. 8 illustrates the fundamental theory of the reflection grating. Suppose that a beam of parallel rays falls on an echellete reflection grating G with a grating space $b$. If the incident and diffracted rays are on the same sides of the normal N and the angle of incidence is nearly equal to the angle of diffraction as shown in FIG. 8, $$\lambda = \frac{2b}{n} \sin i$$

wherein $\lambda$ is the wavelength, $n$ is the order number and $i$ is the angle of incidence and diffraction with the normal.

FIG. 9 illustrates the theory of a sine function generator. The grating G is movable about a pivotal axis O and incorporated to an arm $Ls$, the free end P of which is connected to a slide block S slidably supported on a linear guide K. If the length of the arm $Ls$ is A, the angle between the lever $Ls$ and a base line B is $i$ and the distance of P from the base line is $x$, $$\sin i = \frac{x}{A}$$

Accordingly, $$\lambda = \frac{2b}{An} x + C_{1x}$$

wherein $C_1$ represents a constant. As understood from the above equation, the wavelength of the diffracted ray of which the angle of diffraction is identical with the angle of incidence is linearly proportionated to the distance of the free end P of the arm $Ls$ from the base line B. It is, therefore, possible to scan the wavelength range in a linearly proportional relationship by moving the free end P of the arm $Ls$ at a constant speed in the direction perpendicular to the base line B. The movement of the free end P of the arm $Ls$ may be obtained by driving a lead screw J extending in a direction perpendicular to the base line B, said lead screw J during its rotation moving a nut H riding thereon. The guide K for the slide block S is attached to the nut H and extends in a direction parallel to the base line B.

The above sine function generating mechanism may be utilized for revolving each of the gratings $G_1$, $G_2$ and $G_3$ illustrated in FIG. 1. The lead screw J may be common over three sine function generators for the respective gratings $G_1$, $G_2$ and $G_3$ so that they may be interconnected to each other.

In infrared ray spectroscopes, the scanning operation is usually carried out in wavenumber. In case of wavenumber, the equation is as follows:

$$\nu = \frac{n}{2b} \operatorname{cosec} i$$

wherein $\nu$ is the wavenumber, $n$ is the order number and $i$ is the angle of incidence and diffraction with the normal.

Referring to FIG. 10, suppose a right-angled triangle OQP. If the angle at Q is a right angle and the length of OP is $x$, the angle $i$ at P is given by the following equation:

$$\operatorname{cosec} i = \frac{x}{A}$$

Accordingly, $$\nu = \frac{n}{2bA} x = C_{2x}$$

wherein $C_2$ represents a constant. It will be understood from the above that the wavenumber is in a linearly proportional relationship with the distance between O and P. The so-called "cosecant bar" as indicated $Lc$ is incorporated to the grating G turntable about the pivotal point O and has a linearly sloped portion EF which cooperates with a drive contact member R, the angle of the sloped portion EF with respect to a base line B passing through the pivotal point O of the grating G being correspondent to the angle of diffraction on the grating G. The drive contact member R is fed by a suitable constant speed, linear drive mechanism along the base line B.

In the embodiment illustrated in FIGS. 5 and 6, such a cosecant bar mechanism as mentioned above is utilized for controlling the angle of incidence of the grating. The first grating $G_1$ is pivotally carried through a bearing (not shown) by a bracket 61 fixed on the slide table 51. The pivot 62 of the grating $G_1$ is secured to one end of a cosecent bar $F_1$ having a contact edge $E_1$ generating the cosecant function. The contact edge $E_1$ is always in contact by the force of a spring 63 with a linearly driven member which may be a roller 64 attached to a nonrotating-nut 65 riding on a precision lead screw 66. In the same manner, the other two gratings $G_2$ and $G_3$ (not shown in FIG. 6) are pivotally carried on the slide table 51 and engage at their own cosecant bar $F_2$ and $F_3$ with the respective linearly driven members 64. $E_2$ and $E_3$ indicate the contact edges of the cosecant bars $F_2$ and $F_3$, respectively. These three lead screws 66 extend in the directions parallel to the parallel light from the collimating mirror 35 and are connected to a single shaft 67 extending in the direction of the movement of the slide table 51 by the respective bevel gearings 68 so that they may be driven simultaneously. The shaft 67 may be interconnected to the shaft 69 of the worm 47 for driving the before-mentioned wavelength cam 45 of the monochromator through a gear 70, an elongated cylindrical gear 71, a shaft 72, bevel gears 73, a shaft 74 and bevel gears 75. Connection of the shaft 67 to the shaft 72 through the utilization of a cylindrical gear 71 enables the maintenance of the drive connection between these two shafts during the sliding movement of the table 51.

Cosecant bars $F_1$, $F_2$ and $F_3$ have their own operative lengths namely, linearly sloped portions, which are operative when the respective gratings $G_1$, $G_2$ and $G_3$ are in the line of reflection from the collimating mirror 35. FIGS. 11a, 11b and 11c show the operative lengths of the cosecant bars. The cosecant bar $F_1$ has an operative length $f_1$, the cosecant bar $F_2$ has two operative lengths $f_2$, $f_2'$, and cosecant bar $F_3$ has an operative length $f_3$. The rollers as linearly driven members travel these operative lengths when the respective gratings are put in the optical path. The remaining or transition portions in the respective cosecant bars $F_1$, $F_2$ and $F_3$ may be shaped by gradual slopes so as not to form any discontinuous or serrated portions. In this maner each cosecant bar can follow the movement of the linearly driven member both in its forward and return movement.

The scanning operation is as follows:

The first grating $G_1$ is first set in the optical path of the parallel rays from the collimating mirror 35. The grating $G_1$ is illuminated with a selected narrow range of wavenumber passing through the slit 34 of the monochromator 24. The wavenumber range corresponds to the spectral region to be scanned with grating $G_1$. At this state, the movement of the grating $G_1$ about its axis by the first cosecant bar $F_1$ may scan the wavenumber region from 4,000 to 1,550 cm.$^{-1}$ in the first-order spectra, the roller 64 attached to the nut 65 travelling along the operative length $f_1$ of the contact edge $E_1$ of the bar $F_1$. At the end of scanning with the first grating $G_1$, the slide table 51 is moved by driving the lead screw 55 until the second grating $G_2$ becomes in the optical path to take the place of the first grating $G_1$. When the second grating $G_2$ has been set in the optical path, the roller 64 which is always in contact with the edge $E_2$ of the cosecant bar $F_2$ come to one end of the operative length $f_2$ of the edge $E_2$. The wavenumber range with which the second grating $G_2$ is illuminated is automatically shifted to a contiguous one by the wavenumber cam 44 of the monochromator 24. The second grating $G_2$ may scan the wavenumber region from 1,750 to 1,280 cm.$^{-1}$ in the third-order spectra while the roller 64 travels over the operative length $f_2$ of the edge $E_2$ of the cosecant bar $F_2$. The two contiguous spectral regions which are scanned with the first and second gratings $G_1$ and $G_2$ have a common range from 1,750 to 1,550 cm.$^{-1}$ in the wavenumber. The interchange of the two gratings may be carried out at any wavenumber in the overlapped region. The interchange of the gratings from $G_2$ to $G_3$ is carried out in a similar manner. The third grating $G_3$ may scan the wavenumber region from 1,360 to 650 cm.$^{-1}$ in the first-order spectra. At the end of the scanning with the third grating $G_3$, the slide table is turned back until the second grating $G_2$ becomes in the optical path again. Then, while the roller 64 travels over the other operative length $f_2'$ of the contact edge $E_2$ of the cosecant bar $F_2$, the second grating $G_2$ may scan the wavenumber region from 780 to 400 cm.$^{-1}$ in the first-order spectra.

In the above scanning operation, the three rollers 64 which are in contact with the respective cosecant bars $F_1$, $F_2$ and $F_3$ are moved simultaneously. In the gratings which are not put in the optical path, the rollers travel along the nonoperative lengths of the respective cosecant bars. None of the cosecant bars is formed in a serrated shape. The scanning operation by moving the rollers may be reversed at any point and at any time.

Although some particular embodiments of the invention have been illustrated, it is understood that the invention is not limited thereto since various modifications may be made, and it is contemplated by the appended claims to cover any such modification as fall within the true spirit and scope of the invention.

I claim:

1. A grating spectroscope comprising means for illuminating the system with a narrow range of wavelength, a collimator, at least two echellete reflection gratings having different grating spaces, a table on which said gratings are arranged in spaced relationship to each other in a straight line direction normal to the optical path of parallel rays reflected from said collimator, said gratings being arranged to receive the entire width of said parallel rays, a drive mechanism for moving said table in the direction of the line of arrangement of said gratings so that said gratings may be individually selectively positioned in said optical path of parallel rays, means rotatably mounting each of said gratings so as to be rotatable about an axis of revolution parallel to the rulings thereof, means for simultaneously revolving each of said gratings about said axis of revolution so that the angle of incidence of said parallel rays upon the individual grating positioned in the optical path thereof is continuously varied and all of said gratings are revolved at a constant predetermined angle with respect to each other, whereby each grating may be moved into said optical path of parallel rays at the desired angle of incidence to continuously scan a light spectrum, and means for detecting the spectral light reflected from the grating positioned in said optical path.

2. A grating spectroscope comprising means for illuminating the system with a narrow range of wavelength, a collimator, at least two echellete reflection gratings having different grating spaces, a table on which gratings are arranged in spaced relationship to each other in a straight line direction normal to the optical path of parallel rays reflected from said collimator, said gratings being arranged to receive the entire width of said parallel rays, a drive mechanism for moving said table in the direction of the line of arrangement of said gratings so that said grating may be individually selectively positioned in said optical path of parallel rays, means rotatably mounting each of said gratings so as to be rotatable about an axis of revolution parallel to the rulings thereof, means for simultaneously revolving each of said gratings about said axis of revolution so that the angle of incidence of said parallel rays upon the individual grating positioned in the optical path thereof is continuously varied and all of said gratings are revolved at a constant predetermined angle with respect to each other, whereby each grating may be moved into said optical path of parallel rays at the desired angle of incidence to continuously scan a light spectrum, said means for revolving each of said gratings including a sine function generator, whereby the scanning of the wavelength range is carried out in a linearly proportional relationship with the drive movement for revolving said gratings, and means for detecting the spectral light reflected from the grating positioned in said optical path.

3. A grating spectroscope as defined in claim 2, wherein said sine function generator comprises a rod member secured at one end to said rotatable grating, means for linearly driving a member in a direction normal to said optical path of parallel rays reflected from said collimator, and a support member fixed to said linearly driven member, said support member being slidably connected to the free end of said rod member.

4. A grating spectroscope comprising means for illuminating the system with a narrow range of wavelength, a collimator, at least two echellete reflection gratings having different grating spaces, a table on which said gratings are arranged in spaced relationship to each other in a straight line direction normal to the optical path of parallel rays reflected from said collimator, said gratings being arranged to receive the entire width of said parallel rays, a drive mechanism for moving said table in the direction of the line of arrangement of said gratings so that said gratings may be individually selectively positioned in the optical path of said parallel rays, means rotatably mounting each of said gratings so as to be rotatable about an axis of revolution parallel to the rulings thereof, means for simultaneously revolving each of said gratings about said axis of revolution so that the angle of incidence of said parallel rays upon the individual grating positioned in the optical path thereof, is continuously varied and all of said gratings are revolved at a constant predetermined angle with respect to each other, whereby each grating may be moved into said optical path of parallel rays at the desired angle of incidence to continuously scan a light spectrum, said means for revolving each of said gratings including a cosecant function generator, whereby the scanning of the wavenumber range with the gratings is carried out in a linearly proportional relationship with the drive movement for revolving said gratings, and means for detecting the spectral light reflected from the grating positioned in said optical path.

5. A grating spectroscope as defined in claim 4, wherein each of said cosecant function generators comprises a cosecant bar secured at one end to said rotatable grating and means for linearly driving a member in co-operating relationship with said cosecent bar, each of said cosecant bars having different operative lengths, and including means interconnecting each of said linearly driven members to each other so as to operate simultaneously and to drive said members successively to the operative portions of their corresponding cosecant bars.

6. A grating spectroscope as defined in claim 5, wherein said linearly driven members are driven in a direction parallel to said optical path.

7. A grating spectroscope as defined in claim 5, wherein one of said cosecant bars has at least two operative lengths between which a non-operative length is connected, said non-operative length being continuously curved so that said linearly driven member may engage said one cosecant bar reversibly in opposite directions.

8. A grating spectroscope comprising means for illuminating the system with a narrow range of wavelength, means for continuously scanning said range of wavelength, a collimator, at least two echellete reflection gratings having different grating spaces, a table on which said gratings are arranged in spaced relation to each other in a straight line direction normal to the optical path of parallel rays reflected from said collimator, said gratings being arranged to receive the entire width of said parallel rays, a drive mechanism for moving said table in the direction of the line of arrangement of said gratings so that said gratings may be individually selectively positioned in said optical path of parallel rays, means rotatably mounting each of said gratings so as to be rotatable about an axis of revolution parallel to the rulings thereof, means for simultaneously revolving each of said gratings about said axis of revolution so that the angle of incidence of said parallel rays upon the individual grating positioned in the optical path thereof is continuously varied and all of said gratings are revolved at a constant predetermined angle with respect to each other, whereby each grating may be moved into said optical path of parallel rays at the desired angle of incidence to continuously scan a light spectrum, said means for revolving each of said gratings including a cosecant function generator, whereby the scanning of the wavenumber range with the gratings is carried out in a linearly proportional relationship with the drive movement for revolving said gratings, simultaneous drive means for said cosecant function generators included in said means for revolving said gratings, means interconnecting said simultaneous drive means for said cosecant function generators and said means for continuously scanning the wavelength range, and means for detecting the spectral light reflected from the grating positioned in said optical path of parallel rays.

References Cited

UNITED STATES PATENTS

| 3,098,408 | 7/1963 | Cory | 88—14 |
| 3,216,315 | 11/1965 | Keller | 88—14 |
| 3,229,563 | 1/1966 | Demay. | |

FOREIGN PATENTS 861,259   2/1961   Great Britain.

JEWELL H. PEDERSEN, *Primary Examiner.*

B. J. LACOMIS, *Assistant Examiner.*